United States Patent
Lee et al.

(10) Patent No.: US 9,209,488 B2
(45) Date of Patent: Dec. 8, 2015

(54) METHOD FOR MANUFACTURING A SOLID ELECTROLYTE

(71) Applicant: Electronics and Telecommunications Research Institute, Daejeon (KR)

(72) Inventors: Young-Gi Lee, Daejeon (KR); Kwang Man Kim, Daejeon (KR); Kunyoung Kang, Daejeon (KR); Dong Ok Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/298,059

(22) Filed: Jun. 6, 2014

(65) Prior Publication Data

US 2015/0024124 A1    Jan. 22, 2015

(30) Foreign Application Priority Data

Jul. 17, 2013  (KR) .......................... 10-2013-0084284
Dec. 27, 2013  (KR) .......................... 10-2013-0165355

(51) Int. Cl.
| | |
|---|---|
| *H01M 10/052* | (2010.01) |
| *H01M 10/056* | (2010.01) |
| *H01M 10/0565* | (2010.01) |
| *C08J 5/18* | (2006.01) |

(52) U.S. Cl.
CPC .............. *H01M 10/0565* (2013.01); *C08J 5/18* (2013.01); *H01M 10/052* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 6,632,256 B1 * | 10/2003 | Ishizaki et al. ............... | 29/623.5 |
| 7,399,556 B2 | 7/2008 | Lee et al. | |
| 2002/0160269 A1 * | 10/2002 | Choi et al. ..................... | 429/303 |

(Continued)

FOREIGN PATENT DOCUMENTS

| | | | |
|---|---|---|---|
| KR | 10-0569185 B1 | 4/2006 | |
| KR | 10-1009995 B1 | 1/2011 | |

(Continued)

OTHER PUBLICATIONS

Weili Li, et al., "A composite microporous gel polymer electrolyte prepared by ultra-violet cross-linking", European Polymer Journal, vol. 43, pp. 522-528, Feb. 2007.

(Continued)

*Primary Examiner* — Lisha Jiang
(74) *Attorney, Agent, or Firm* — Rabin & Berdo, P.C.

(57) ABSTRACT

A method for manufacturing a solid electrolyte includes dissolving first polymers and second polymers in a cosolvent including a first cosolvent and a second cosolvent to provide a preparation solution; adding a lithium solution to the preparation solution to provide a mixture solution; removing the second cosolvent from the mixture solution to prepare an electrolyte paste that exhibits thixotropy; and coating the electrolyte paste onto a substrate to form an electrolyte film, wherein the electrolyte paste in a gel state is characterized by the first polymers being aligned in parallel to one another in one direction; the second polymers randomly surrounding the first polymers and having an average molecular weight that is greater than that of the first polymers; and a lithium solution provided between the first polymers and the second polymers.

8 Claims, 6 Drawing Sheets

(56) References Cited

U.S. PATENT DOCUMENTS

| | | | |
|---|---|---|---|
| 2009/0029253 A1* | 1/2009 | Itou et al. | 429/223 |
| 2010/0259224 A1* | 10/2010 | Zinck et al. | 320/137 |
| 2011/0108754 A1 | 5/2011 | Kim et al. | |
| 2012/0058378 A1* | 3/2012 | Lee et al. | 429/127 |

FOREIGN PATENT DOCUMENTS

| | | |
|---|---|---|
| KR | 10-1050771 B1 | 7/2011 |
| KR | 10-1120238 B1 | 3/2012 |
| WO | WO-01/89020 A1 | 11/2001 |

OTHER PUBLICATIONS

C. Gerbaldi, et al., "UV-curable siloxane-acrylate gel-copolymer electrolytes for lithium-based battery applications", Electrochimica Acta, vol. 55, pp. 1460-1467, Jan. 2010.

J.R. Nair, et al., "UV-cured methacrylic membranes as novel gel-polymer electrolyte for Li-ion batteries", Journal of Power Sources, vol. 178, pp. 751-757, Apr. 2008.

* cited by examiner

METHOD FOR MANUFACTURING A SOLID ELECTROLYTE

CROSS-REFERENCE TO RELATED APPLICATIONS

This U.S. non-provisional patent application claims priority under 35 U.S.C. §119 of Korean Patent Application Nos. 10-2013-0084284, filed on Jul. 17, 2013, and 10-2013-0165355, filed on Dec. 27, 2013, the entire contents of which are hereby incorporated by reference.

BACKGROUND OF THE INVENTION

1. Field of the Invention

The present disclosure herein relates to a lithium battery, and more particularly, to a method for manufacturing a solid electrolyte.

2. Description of the Related Art

As the importance of energy storage and transforming technology increases, there is growing interest in a lithium battery. The lithium battery has very high energy density and light weight when compared to other batteries, and may be used as a power source of portable electronic equipment, etc. The lithium battery may include a cathode, an anode and an electrolyte.

A carbonate-based solvent in which a lithium salt ($LiPF_6$) is dissolved is widely used as an organic liquid electrolyte. Since the organic liquid electrolyte has high mobility of lithium ions, good electrochemical properties may be obtainable. However, defects concerning stability due to high flammability, volatility, and the leakage of liquid may be generated.

An inorganic-based solid electrolyte may secure the stability and the mechanical strength of a battery. An oxide-based solid electrolyte and a sulfide-based solid electrolyte are widely used as the inorganic-based solid electrolyte. The oxide-based solid electrolyte may induce grain boundary resistance, and the realization of the oxide-based solid electrolyte may be impossible if not manufactured in a bulk shape. The sulfide-based solid electrolyte has good ion conductivity, however is sensitive to humidity, etc, and thus, the manufacture of the sulfide-based solid electrolyte is possible only under an inert atmosphere. Accordingly, various studies on electrolytes for lithium batteries are proceeding.

SUMMARY OF THE INVENTION

The present disclosure provides a method for manufacturing a solid electrolyte having high ion conductivity and stability.

The present disclosure also provides an electrolyte paste having thixotropy and a method for manufacturing a solid electrolyte using the same.

The object of the present inventive concept should not be construed as limited to the object set forth herein. Rather, other objects not set forth herein will be precisely understood to those skilled in the art from the following.

Embodiments of the inventive concept provide methods for manufacturing a solid electrolyte including preparing a preparation solution by dissolving first polymers and second polymers in a cosolvent which includes a first cosolvent and a second cosolvent, preparing a mixture solution by adding a lithium solution to the preparation solution, preparing an electrolyte paste by removing the second cosolvent of the mixture solution, and forming an electrolyte film by coating the electrolyte paste on a substrate.

In some embodiments, the preparation of the electrolyte paste may include preparing an electrolyte paste having a sol state by stirring the mixture solution, and preparing an electrolyte paste having a gel state by gelling the electrolyte paste having a sol state at from about 5° C. to about 50° C. The electrolyte paste having a sol state may include the same material and have the same composition ratio as the electrolyte paste having a gel state.

In other embodiments, the electrolyte paste having a gel state may include the first polymers aligned in parallel in one direction, the second polymers irregularly surrounding the first polymers and having a greater average molecular weight than the first polymers, and a lithium solution provided between the first polymers and the second polymers.

In still other embodiments, the first polymers of the electrolyte paste having a sol state may be arranged in different directions from each other.

In even other embodiments, the first polymers may have an average molecular weight of about 1 to about 100,000 and the second polymers may have an average molecular weight of about 200,000 to about 1,000,000.

In yet other embodiments, the coating the electrolyte paste may be performed by a screen printing method.

In further embodiments, the second cosolvent may be an aprotic solvent having a boiling point of about 1° C. to about 800° C.

In still further embodiments, the mixture solution may have a sol state.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE INVENTION

Exemplary embodiments of the inventive concept will be described below in more detail with reference to the accompanying drawings to sufficiently understand the constituent and effects of the inventive concept. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Those skilled in the art will understand an appropriate circumstance for conducting the concept of the invention.

The terminology used herein is for the purpose of describing particular example embodiments only and is not intended to limit the present inventive concept. As used herein, the singular forms are intended to include the plural forms as well, unless the context clearly indicates otherwise. It will be further understood that the terms "comprises" and/or "comprising," when used in this specification, specify the presence of stated features, steps, operations, and/or devices, but do not preclude the presence or addition of one or more other features, steps, operations, and/or devices thereof.

It will also be understood that when a layer (or film) is referred to as being 'on' another layer (or film) or substrate, it can be directly on the other layer (or film) or substrate, or intervening layers (or films) may also be present.

It will be understood that, although the terms first, second, third etc. may be used herein to describe various regions, layers (or films), etc. these regions and layers should not be limited by these terms. These terms are only used to distinguish one region or layer (or film) from another region or layer (film). Thus, a first layer discussed below could be termed a second layer. Example embodiments embodied and described herein may include complementary example embodiments thereof. Like reference numerals refer to like elements throughout.

Unless otherwise defined, all terms used herein have the same meaning as commonly understood by one of ordinary skill in the art to which this inventive concept belongs.

Hereinafter exemplary embodiments for manufacturing a solid electrolyte according to an embodiment of the inventive concept will be explained.

Figure 1:
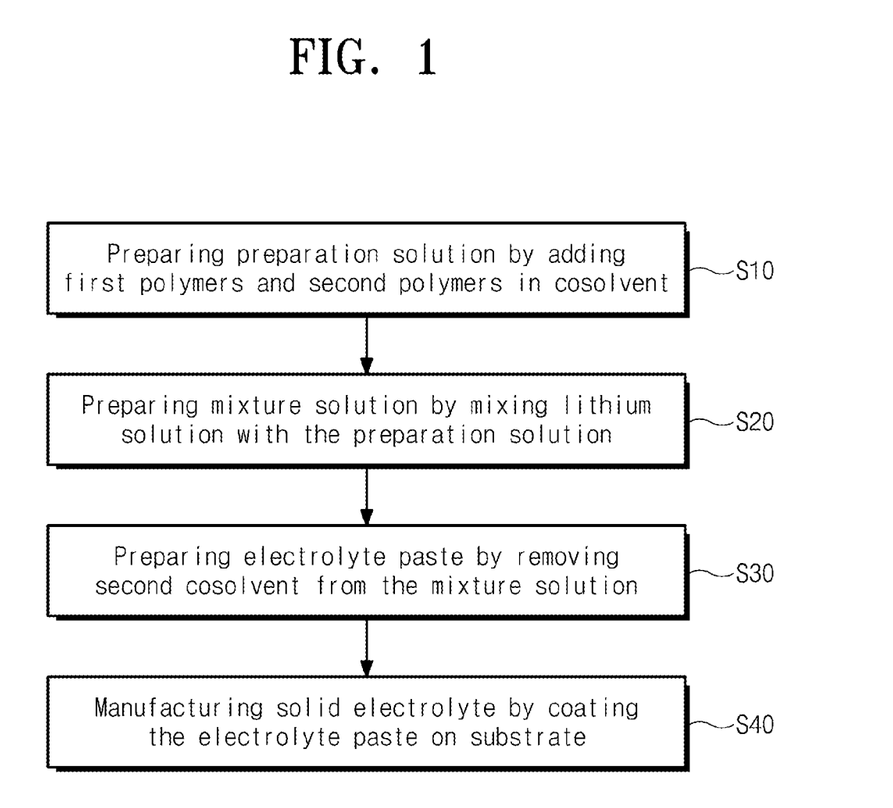
FIG. 1 is a flowchart illustrating a method for manufacturing a solid electrolyte according to an embodiment of the inventive concept.

FIG. 1 is a flowchart illustrating a method for manufacturing a solid electrolyte according to an embodiment of the inventive concept.

Referring to FIG. 1, first polymers and second polymers may be added into a cosolvent to prepare a preparation solution (S10). The first polymers may have an average molecular weight of about 1 to about 100,000 and, more particularly, about 20,000. The first polymers may be a cellulose-based polymer (for example, hydroxypropyl cellulose). The first polymers may have lyotropic liquid crystal properties. The lyotropic liquid crystal properties may be obtained from a polymer showing aligning properties in one direction like a liquid crystal when the polymer is dissolved in a solvent to increase the viscosity thereof. For example, the alignment of the first polymers may be determined according to the concentration of the solvent. The second polymers may have an average molecular weight of about 200,000 to about 1,000,000, for example, an average molecular weight of about 1,000,000. For example, the second polymers may include a copolymer of vinylidene fluoride and hexafluoropropylene, polyethylene oxide, and polyvinyl chloride, etc. Through the inclusion of the second polymers, a solid electrolyte may have high mechanical strength. The first polymers and the second polymers may have a weight ratio of about 3:97 to about 90:10, and particularly about 30:70. The cosolvent may include a first cosolvent and a second cosolvent. The first cosolvent may include N-methyl pyrrolidone (NMP), dimethylformamide (DMF), and a mixture thereof. The second cosolvent may have a low boiling point, for example, of about 1° C. to about 100° C. The second cosolvent may be an aprotic solvent, for example, acetone. A high speed stirring process may be performed with respect to the preparation solution. For example, the preparation solution may be stirred at 1,200 rpm conditions for 10 minutes. Thus, the first polymers, the second polymers, and the first mixture solvent included in the preparation solution may be homogeneously mixed. The preparation solution may have a sol state.

A mixture solution may be prepared by mixing a lithium solution with the preparation solution (S20). A lithium solution may be prepared by dissolving a lithium salt in an organic solvent. For example, a lithium solution having a concentration of 1M may be prepared. The lithium salt may be selected from the group consisting of lithium perchlorate ($LiClO_4$), lithium triflate ($LiCF_3SO_3$), lithium hexafluorophosphate ($LiPF_6$), lithium tetrafluoroborate ($LiBF_4$), lithium trifluoromethanesufonylimide ($LiN(CF_3SO_2)_2$), and a combination thereof. The organic solvent may include ethylene carbonate, propylene carbonate, dimethyl carbonate, diethyl carbonate, ethyl methyl carbonate, gamma-butyrolactone, or a mixture thereof. For example, each of the dimethyl carbonate, the diethyl carbonate, and the ethyl methyl carbonate may be included in about 10 wt % to about 50 wt % based on the organic solvent. The ethylene carbonate may be included in about 10 wt % to about 50 wt % based on the organic solvent. The propylene carbonate may be included in about 1 wt % to about 30 wt % based on the organic solvent. The gamma-butyrolactone may be included in about 10 wt % to about 50 wt % based on the organic solvent. The mixture solution may have a sol state.

An electrolyte paste may be prepared by removing the second cosolvent from the mixture solution (S30). For example, the electrolyte paste having a sol state may be prepared by performing a stirring process with respect to the mixture solution. In an embodiment, the mixture solution may be stirred under conditions of at least about 1,500 rpm (for example, about 2,000 rpm) for 15 minutes. The second cosolvent may have the lowest boiling point among the materials included in the mixture solution. For example, the second cosolvent may have a lower boiling point than those of the polymers, the lithium solution, and the first cosolvent. Through stirring the mixture solution, the second cosolvent having a low boiling point may be volatilized. The first polymers, the second polymers, and the lithium salt may not be removed by the stirring process. Thus, the electrolyte paste having a sol state may have higher concentration of the first polymers, concentration of the second polymers, and concentration of the lithium salt than the mixture solution. Thus, the electrolyte paste having a sol state may have a higher viscosity than the mixture solution.

The electrolyte paste having a sol state may be gelled at about 5° C. to about 50° C. to prepare an electrolyte paste having a gel state. The electrolyte paste having a gel state may include the same materials as the electrolyte paste having a sol state. The electrolyte paste having a gel state may have the same component ratios as those of the electrolyte paste having a sol state. For example, the gelation of the electrolyte paste of the sol state may be performed at room temperature (for example, at about 25° C.) for about 4 to about 10 hours, and more particularly for about 5 to about 6 hours. The electrolyte paste having a gel state of the inventive concept may have thixotrophy. The thixotropy means a phenomenon shown when a polymer solution of a high concentration exhibits a sol state when an external force is applied while exhibiting a gel state when the external force is removed. That is, the thixotropy may mean the phenomenon of changing flowability of a polymer according to an external force applied to the polymer solution.

Figure 2:
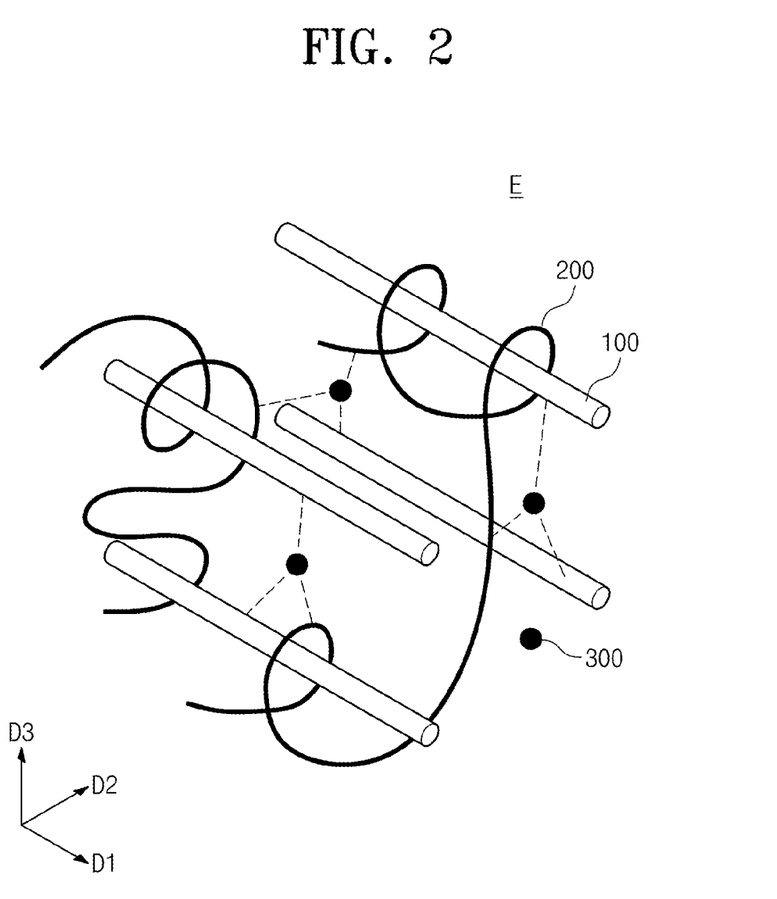
FIG. 2 is a perspective view of an electrolyte paste having a gel state.
Figure 3:
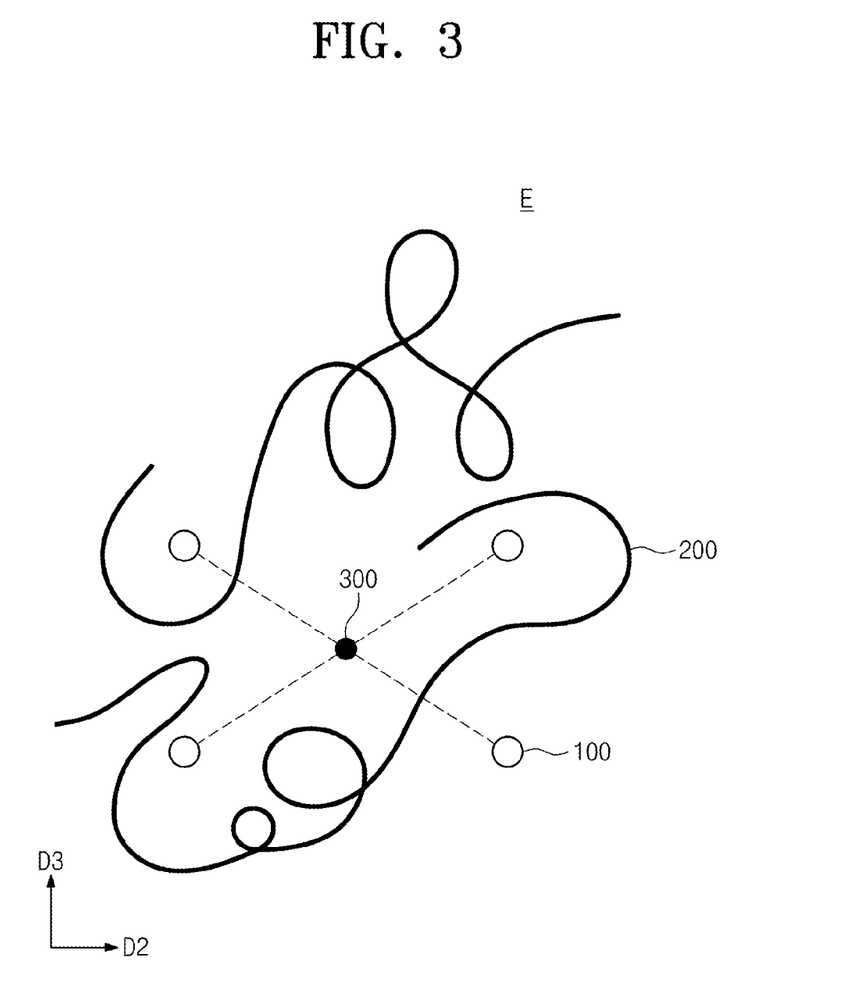
FIG. 3 is a cross-sectional view of FIG. 2 viewed from D1 direction.
Figure 4:
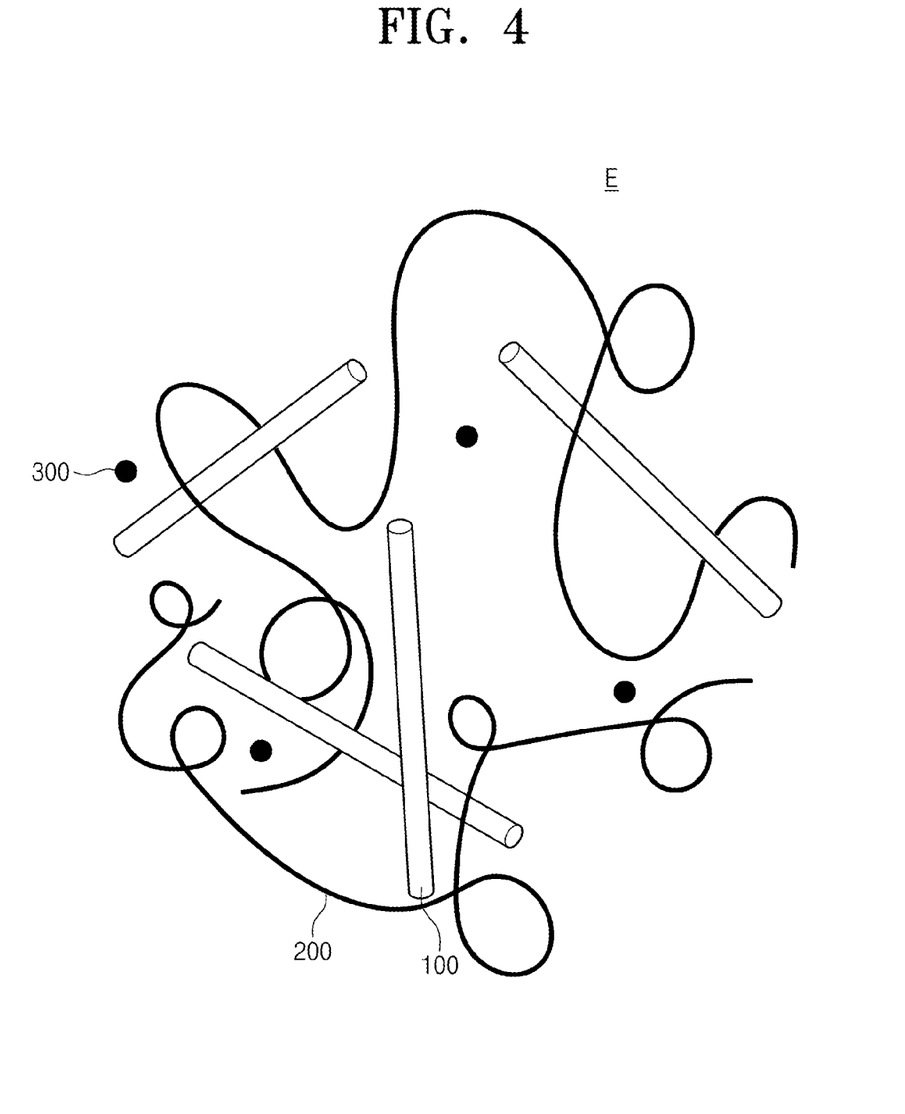
FIG. 4 is a perspective view of an electrolyte paste having a sol state.

Referring to FIGS. 2 to 4, an electrolyte paste having the thixotropy will be explained in detail.

FIG. 2 is a perspective view of an electrolyte paste having a gel state. FIG. 3 is a cross-sectional view of FIG. 2 viewed from D1 direction. FIG. 4 is a perspective view of an electrolyte paste having a sol state.

Referring to FIGS. 2 and 3, an electrolyte paste E may have a gel state. First polymers 100 may be arranged in parallel in one direction. Second polymers 200 may be provided that irregularly surround the first polymers. A lithium solution may be provided between the first polymers 100 and the second polymers 200. Lithium ions 300 included in the lithium solution may interact with the first polymers 100 and/or the second polymers 200. For example, the lithium ion 300 may make interactions (for example, intermolecular interaction) with the first polymers 100 as illustrated in a dotted line in FIG. 3. The first polymers 100 may be separated with a certain distance by a lithium salt. The electrolyte paste E may have a gel state by the lithium solution. For example, the electrolyte paste E may be nonflowable. The lithium solution acts as a physical crosslinking agent between the first polymers 100 and the second polymers 200 to form 3D structured polymer networks.

Referring to FIG. 4, the electrolyte paste E may show an electrolyte paste at the moment of or immediately after applying an external force. Alternatively, the electrolyte paste E may be an electrolyte paste having a sol state immediately after preparing the mixture solution, for example, the electrolyte paste having a sol state as explained in S30 of FIG. 1. The first polymers 100, the second polymers 200, and the lithium ions 300 may be irregularly distributed in the electrolyte paste E. The first polymers 100 may be arranged in different directions to each other. When an external force is applied to the electrolyte paste E of the gel state, the interaction between the lithium ions 300 and the polymers 100 and 200 may be broken. Thus, the electrolyte paste E may exhibit a sol state. When the electrolyte paste E having a sol state is treated in conditions of about 5° C. to about 50° C. for at least about 4 hours (when having a relax time), the interaction between the lithium ions 300 and the polymers 100 and 200 may be generated. In this case, the electrolyte paste E may show the gel state as illustrated in FIGS. 2 and 3 again. The electrolyte paste E of the inventive concept may have different states (for example, a gel state or a sol state) according to the application of external force.

Referring to FIG. 1 again, the electrolyte paste may be coated on a substrate, and a solid electrolyte may be formed (S40). The solid electrolyte may have a film shape. For example, the solid electrolyte may be formed by a screen printing process. The electrolyte paste having a liquid or a sol state may be unsuitable for the screen printing process. For example, the electrolyte paste having the liquid or the sol state may not maintain a form on a screen plate having a mesh structure but may be absorbed and flow before performing the printing process. Since the electrolyte paste of the inventive concept is provided as a gel state, the paste may not be absorbed or flow before the screen printing, and a solid electrolyte having a film state may be easily manufactured. The solid electrolyte may have a uniform surface. The solid electrolyte may be formed to a uniform thickness. Then, the cosolvent may be removed from the electrolyte film, and the solid electrolyte may be completed. Since the solid electrolyte of the inventive concept includes the second polymers, the mechanical strength of the solid electrolyte may be improved. Thus, the solid electrolyte according to an embodiment may be easily manufactured in a large-size.

Hereinafter a method for manufacturing a lithium battery according to an embodiment of the inventive concept will be explained.

Figure 5:
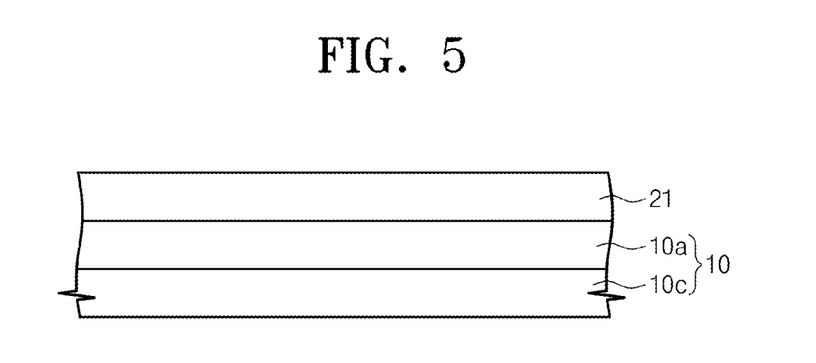
FIGS. 5 to 7 illustrate a flowchart of a method for manufacturing a lithium battery according to an embodiment of the inventive concept.
Figure 6:
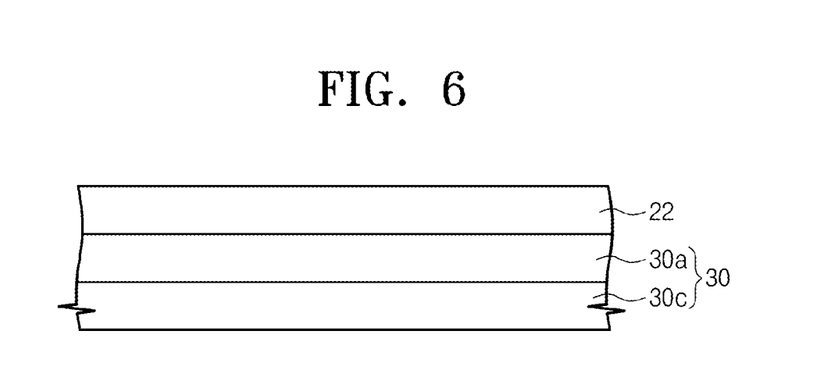
Figure 7:
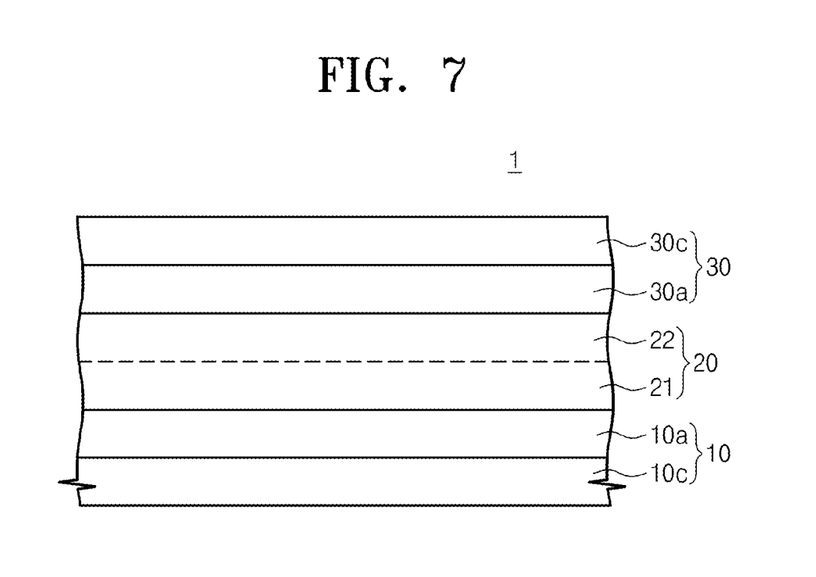

FIGS. 5 to 7 illustrate a flowchart of a method for manufacturing a lithium battery according to an embodiment of the inventive concept. Hereinafter the repeated parts as the above explanation will be omitted.

Referring to FIG. 5, a first electrolyte film 21 may be formed on a cathode 10. The cathode 10 may include a cathode current collecting layer 10c and a cathode active layer 10a stacked one by one. The first electrolyte film 21 may be formed by the same method as explained above for forming the solid electrolyte 20 as an embodiment of FIG. 1. The cathode 10 may be the substrate explained in S40 of FIG. 1. As the first electrolyte film 21 is coated on the cathode active layer 10a, the first electrolyte film 21 may make smooth contact with the cathode active layer 10a. The first electrolyte film 21 may have a uniform thickness. Thus, the electron migration between the cathode 10 and the first electrolyte film 21 may be facilitated.

Referring to FIG. 6, a second electrolyte film 22 may be formed on an anode 30. For example, the anode 30 including an anode current collecting layer 30c and an anode active layer 30a may be provided. The second electrolyte film 22 may be formed by the same method as that for forming the solid electrolyte explained as an embodiment of FIG. 1. The anode 30 may be the substrate explained in S40 of FIG. 1. The second electrolyte film 22 may be smoothly attached to the anode active layer 30a.

Referring to FIG. 7, the second electrolyte film 22 may be attached to the first electrolyte film 21, and a lithium battery 1 may be manufactured. For example, the first electrolyte film 21 and the second electrolyte film 22 may be disposed to make contact with each other. The second electrolyte film 22 may be attached to the first electrolyte film 21, and a solid electrolyte 20 may be manufactured. The first electrolyte film 21 may include the same material as the second electrolyte film 22. Thus, the ion conductivity of the solid electrolyte 20 may be improved. The solid electrolyte 20 may play the role of a passage for migrating ions between the cathode 10 and the anode 30.

Hereinafter the preparation of an electrolyte paste and the manufacture of a solid electrolyte according to the inventive concept, and results on the evaluation of the properties thereof will be explained in detail with reference to experimental embodiments.

Preparation of Electrolyte Paste Having Sol State

Experimental Example 1

A cosolvent was prepared by mixing N-methyl pyrrolidone (NMP) and acetone by the weight percent of 50:50. A copolymer was prepared by mixing vinylidene fluoride and hexafluoropropylene (Mw 500,000) in the weight percent of 88:12. Hydroxypropyl cellulose (Mw 80,000) and the copolymer of the vinylidene fluoride and the hexafluoropropylene were added into the cosolvent. Thus, a preparation solution was prepared. In this case, the amount added of the hydroxypropyl cellulose was about 10 percent by weight based on the preparation solution, and the amount added of the vinylidene fluoride was about 23 percent by weight based on the preparation solution. The preparation solution was stirred under the conditions of about 1,200 rpm for about 10 minutes.

An organic solvent was prepared by mixing ethylene carbonate (EC), propylene carbonate (PC), and ethyl methyl carbonate (EMC) by the weight percent of 1:1:1. Lithium hexafluorophosphate ($LiPF_6$) was dissolved into the organic solvent, thereby producing a liquid electrolyte (a lithium solution) of 1M concentration. The preparation solution was added into the liquid electrolyte to prepare a mixture solution.

The preparation solution was stirred under the conditions of about 2,000 rpm for about 15 minutes to prepare an electrolyte paste having a sol state.

Comparative Example 1-1

An electrolyte paste having a sol state was prepared. In this comparative example, a lithium solution was not added. For example, a copolymer of vinylidene fluoride and hexafluoropropylene, and hydroxypropyl cellulose were added in a cosolvent. Thus, a preparation solution was prepared. The preparation solution was stirred under the conditions of about 1,200 rpm for about 10 minutes. The preparation solution was stirred under the conditions of about 2,000 rpm for about 15 minutes to prepare an electrolyte paste having a sol state. A cosolvent, a copolymer, and an organic solvent were prepared according to the same procedure described in Experimental Example 1.

Comparative Example 1-2

An electrolyte paste having a sol state of Comparative Example 1-2 was prepared by performing the same procedure described in Experimental Example 1. However, inorganic particles were further included in Comparative Example 1-2. Aluminum oxide ($Al_2O_3$) was used as the inorganic particles.

Comparative Example 1-3

An electrolyte paste having a sol state was prepared by performing the same procedure described in Experimental Example 1. However, the hydroxypropyl cellulose was not added.

Comparative Example 1-4

An electrolyte paste having a sol state was prepared by performing the same procedure described in Experimental Example 1. However, the hydroxypropyl cellulose was not added but aluminum oxide was further added.

Comparative Example 1-5

An electrolyte paste having a sol state was prepared by performing the same procedure described in Experimental Example 1. However, the copolymer of the vinylidene fluoride and the hexafluoropropylene was not added.

Comparative Example 1-6

An electrolyte paste was prepared by performing the same procedure described in Experimental Example 1. However, the copolymer of the vinylidene fluoride and the hexafluoropropylene was not added but aluminum oxide was further added.

Manufacture of Solid Electrolyte and Evaluation of Performance Thereof

Experimental Example 2-1

Manufacture of Solid Electrolyte

A cosolvent was prepared by mixing NMP and acetone by the weight percent of 50:50. Hydroxypropyl cellulose having an average molecular weight of about 80,000 and vinylidene fluoride having an average molecular weight of about 250,000 were added in a solvent. Thus, a preparation solution was prepared. In this case, the amount added of the hydroxypropyl cellulose was about 10 percent by weight based on the preparation solution, and the amount added of the vinylidene fluoride was about 23 percent by weight based on the preparation solution. The preparation solution was stirred under the conditions of about 1,500 rpm for about 5 minutes.

An organic solvent was prepared by mixing EC, PC, and EMC by the weight percent of 1.5:1:1.5. Lithium hexafluorophosphate ($LiPF_6$) was dissolved in the organic solvent to produce a lithium solution of 1M concentration. The preparation solution was added into the lithium solution to prepare a mixture solution. The preparation solution was stirred under the conditions of about 1,500 rpm for about 5 minutes to prepare an electrolyte paste having a sol state. The electrolyte paste having a sol state was treated under closed conditions of at about 25° C. for about 5 hours to prepare an electrolyte paste having a gel state. The electrolyte paste having a gel state was cast on a substrate to manufacture a solid electrolyte having a thickness of about 100 μm.

(Evaluation of Performance of Solid Electrolyte)

A solid electrolyte was disposed between stainless steel (SUS) electrodes having an area of about 2 cm×2 cm. The impedance of the solid electrolyte was measured under the conditions of a frequency range of about 1 Hz to about 1 MHz, and an alternating current (AC) amplitude of about 50 mV.

Experimental Example 2-2

Manufacture of Solid Electrolyte

A solid electrolyte having a film shape was manufactured by performing the same procedure descried in Experimental Example 2-1. However, a copolymer obtained by mixing vinylidene fluoride and hexafluoropropylene (Mw 500,000) by the weight percent of 50:50 was used instead of the vinylidene fluoride.

(Evaluation of Performance of Solid Electrolyte)

The impedance of the solid electrolyte was measured by the same method described in Experimental Example 2-1. However, the solid electrolyte in Experimental Example 2-2 was manufactured by using the copolymer obtained by mixing vinylidene fluoride and hexafluoropropylene by the weight percent of 50:50.

Experimental Example 2-3

Manufacture of Solid Electrolyte

A solid electrolyte having a film shape was manufactured by performing the same procedure descried in Experimental Example 2-1. However, polyethylene oxide having an average molecular weight of about 1,000,000 was used as first polymers.

(Evaluation of Performance of Solid Electrolyte)

The impedance of the solid electrolyte was measured by the same method described in Experimental Example 2-1. However, as described above, the solid electrolyte was manufactured by using the polyethylene oxide.

Experimental Example 2-4

Manufacture of Solid Electrolyte

A solid electrolyte was manufactured by performing the same procedure descried in Experimental Example 2-1. However, polyvinyl chloride having an average molecular weight of about 200,000 was used instead of vinylidene fluoride.
(Evaluation of Performance of Solid Electrolyte)

The impedance of the solid electrolyte was measured by the same method described in Experimental Example 2-1. However, as described above, the solid electrolyte was manufactured by using polyvinyl chloride.

Comparative Example 2

Manufacture of Solid Electrolyte

A solid electrolyte was manufactured. However, hydroxypropyl cellulose was not added in this comparative example. For example, the copolymer of vinylidene fluoride and hexafluoropropylene (Mw 500,000) was added into a cosolvent to prepare a preparation solution. A lithium solution was added in the preparation solution to prepare a mixture solution. The mixture solution was coated on a substrate, and a solid electrolyte was manufactured to a thickness of about 100 μm.
(Evaluation of Performance of Solid Electrolyte)

The impedance of the solid electrolyte was measured by the same method described in Experimental Example 2-1. However, as described above, hydroxypropyl cellulose was not added in the solid electrolyte in this comparative example.

The formation of the electrolyte paste in Experimental Example 1 and Comparative Examples 1-1 to 1-6 was evaluated and is illustrated in the following Table 2. The formation of the electrolyte paste was evaluated after treating the electrolyte paste having a sol state at about 25° C. for about 5 hours. The formation of the electrolyte paste was evaluated according to the formation of a gel electrolyte paste, the thixotropy of the electrolyte paste, and the applicability of a printing process.

Figure 8:
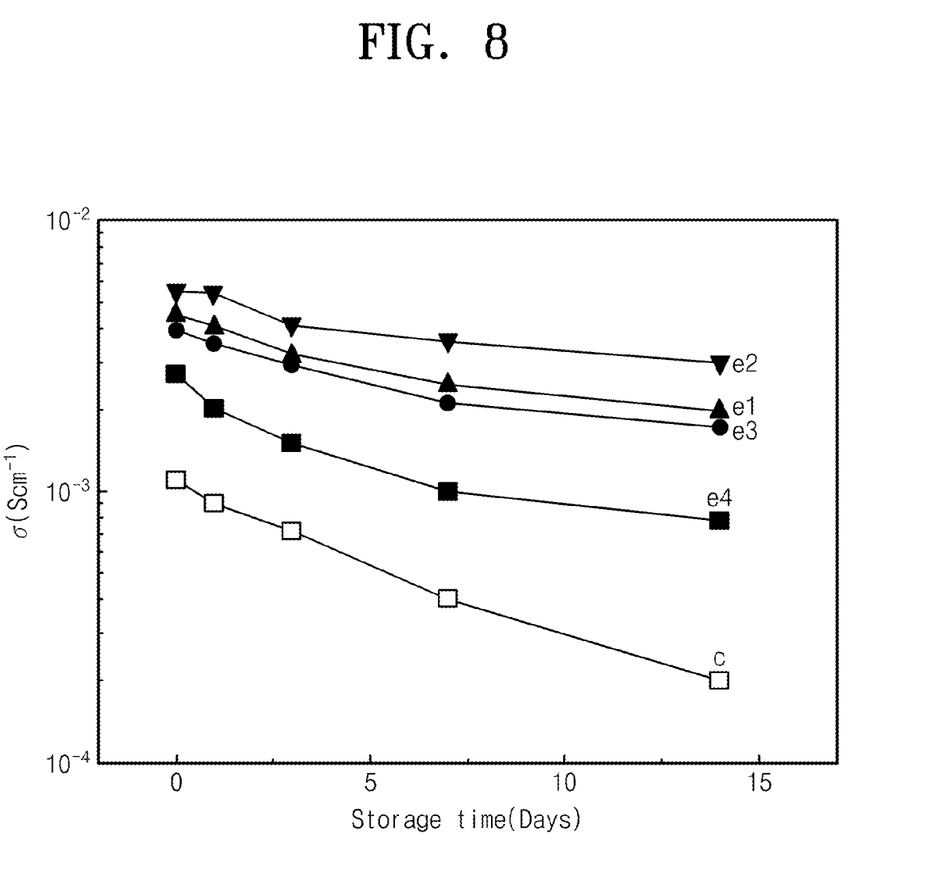
FIG. 8 is a graph illustrating ion conductivity properties according to experimental examples and a comparative example.

Referring to FIG. 8, it would be found that the ion conductivity for Experimental Example 2-1 (e1), Experimental Example 2-2 (e2), Experimental Example 2-3 (e3), or Experimental Example 2-4 (e4) is higher than that for Comparative Example 2 (c). In the solid electrolyte of the comparative example (c), the second polymers may be omitted. Since the solid electrolytes of Experimental Examples (e1, e2, e3 and e4) include the first polymers and the second polymers, an electrolyte paste having a gel state and having thixotropy may be obtained. The electrolyte paste having a gel state may be uniformly coated on an electrode, and the solid electrolytes of the Experimental examples (e1, e2, e3 and e4) may be formed. Since Experimental Examples (e1, e2, e3 and e4) further include the second polymers, the lithium ions may easily interact with the first polymers and the second polymers. Thus, the lithium ions in the solid electrolytes of Experimental Examples (e1, e2, e3 and e4) may easily migrate in the solid electrolyte.

It would be found that the stability for Experimental Examples (e1, e2, e3 and e4) is better than that for Comparative Example 2 (c). Since the solid electrolyte includes the second polymer, the stability of the solid electrolyte may be improved.

According to the inventive concept, a solid electrolyte paste having a gel state may be manufactured. The solid electrolyte paste may include first polymers, second polymers, and a lithium solution. The lithium ions of the lithium solution may interact with the first polymers and the second polymers, respectively. Thus, the solid electrolyte paste may have thixotropy. An electrolyte paste having a gel state may be coated on an electrode, and a solid electrolyte may be easily manufactured. Since the solid electrolyte includes the second polymers, good stability may be attained. The solid electrolyte and the lithium battery manufactured according to the inventive concept may show high ion conductivity.

TABLE 1

|  |  | Com. Example 1 | Exp. Example 1 | Com. Example 1-2 | Com. Example 1-3 | Com. Example 1-4 | Com. Example 1-5 | Com. Example 1-6 |
|---|---|---|---|---|---|---|---|---|
| Composition | First polymers | ○ | ○ | ○ | x | x | ○ | ○ |
|  | Second polymers | ○ | ○ | ○ | ○ | ○ | x | x |
|  | Lithium solution | x | ○ | ○ | ○ | ○ | ○ | ○ |
|  | Inorganic particles | x | x | ○ | x | ○ | x | ○ |
| Evaluation of electrolyte paste formation | Gelation | x | ○ | ○ | ○ | ○ | x | x |
|  | Thixotropy | x | ○ | ○ | x | x | x | x |
|  | Printing process | x | ○ | ○ | x | x | x | x |

In the case when one of the first polymers, the second polymers, and the lithium solution was not included in the electrolyte paste having a sol state, an electrolyte paste having a gel state and having the thixotropy may not be obtained. When the electrolyte paste having a gel state has not the thixotropy, the application to a printing process may be difficult. When the lithium ions interact with the first polymers and the second polymers, respectively, the electrolyte paste having a gel state may show the thixotropy. The inorganic particles may not affect the formation of the electrolyte paste having a gel state. Since the electrolyte paste having a gel state according to the inventive concept includes the first polymers, the second polymers, and the lithium solution, the thixotropy may be attained.

FIG. 8 is a graph illustrating ion conductivity properties according to experimental examples and a comparative example. The ion conductivity may be calculated from the measured result of the impedance.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method for manufacturing a solid electrolyte, comprising:
    preparing a preparation solution by dissolving first polymers and second polymers in a cosolvent system, the cosolvent system including a first cosolvent and a second cosolvent;
    preparing a mixture solution by adding a lithium solution to the preparation solution;

preparing an electrolyte paste that exhibits thixotropy by removing the second cosolvent from the mixture solution, wherein the electrolyte paste is in a sol state; and forming an electrolyte film by coating the electrolyte paste onto a substrate and subsequently gelling the electrolyte paste from the sol state to a gel state on the substrate, wherein the electrolyte film is comprised of:

the first polymers, the first polymers being aligned in parallel to one another in one direction;

the second polymers, the second polymers randomly surrounding the first polymers and having an average molecular weight that is greater than that of the first polymers; and the lithium solution, the lithium solution being provided between the first polymer and the second polymers.

2. The method of manufacturing a solid electrolyte of claim 1, wherein gelling the electrolyte paste is performed at a temperature ranging from about 5° C. to about 50° C.

3. The method of manufacturing a solid electrolyte of claim 2, wherein, in the sol state, each of the first polymers of the electrolyte paste is arranged in random directions with respect to each other.

4. The method for manufacturing a solid electrolyte of claim 1, wherein the second cosolvent has a lower boiling point that is lower than that of each of the first polymers, the second polymers, the lithium solution and the first cosolvent.

5. The method for manufacturing a solid electrolyte of claim 1, wherein the second cosolvent is removed by stirring.

6. The method of manufacturing a solid electrolyte of claim 1, wherein the first polymers have an average molecular weight ranging from about 1 to about 100,000 and the second polymers have an average molecular weight ranging about 200,000 to about 1,000,000.

7. The method for manufacturing a solid electrolyte of claim 1, wherein coating the electrolyte paste is performed by a screen printing method.

8. The method of manufacturing a solid electrolyte of claim 1, wherein the mixture is in a sol state.

* * * * *